July 2, 1963 J. A. CHURCHILL ETAL 3,096,094

SOUND REPRODUCING MACHINES

Filed June 14, 1960 6 Sheets-Sheet 1

INVENTORS:
JOHN ADRIAN CHURCHILL
GARNET MONTAGUE EVELEIGH WILLIAMS
BY Maxwell E. Sparrow
ATTORNEY July 2, 1963 J. A. CHURCHILL ETAL 3,096,094

SOUND REPRODUCING MACHINES

Filed June 14, 1960 6 Sheets-Sheet 2

INVENTORS:
JOHN ADRIAN CHURCHILL
GARNET MONTAGUE EVELEIGH WILLIAMS
BY [signature]
ATTORNEY July 2, 1963 J. A. CHURCHILL ETAL 3,096,094

SOUND REPRODUCING MACHINES

Filed June 14, 1960 6 Sheets-Sheet 3

INVENTORS:
JOHN ADRIAN CHURCHILL
GARNET MONTAGUE EVELEIGH WILLIAMS

BY Maxwell E. Sparrow

ATTORNEY

INVENTORS
JOHN ADRIAN CHURCHILL
GARNET MONTAGUE EVELEIGH WILLIAMS
BY Maxwell E. Sparrow
ATTORNEY INVENTORS:
JOHN ADRIAN CHURCHILL
GARNET MONTAGUE EVELEIGH WILLIAMS
BY [signature]
ATTORNEY July 2, 1963 J. A. CHURCHILL ET AL 3,096,094

SOUND REPRODUCING MACHINES

Filed June 14, 1960 6 Sheets-Sheet 6

INVENTORS:
JOHN ADRIAN CHURCHILL
GARNET MONTAGUE EVELEIGH WILLIAMS
BY [signature]
ATTORNEY 3,096,094

SOUND REPRODUCING MACHINES

John Adrian Churchill, Thorpe-le-Soken, and Garnet Montague Eveleigh Williams, Cranleigh, England, assignors to Foster-Mallard Limited, London, England Filed June 14, 1960, Ser. No. 36,082
Claims priority, application Great Britain June 15, 1959
8 Claims. (Cl. 274—10)

This invention relates to sound reproducing machines of the kind in which grooved disc-shaped records and a pick-up device are used in association with an amplifier, the machine being capable of playing, one after another, a plurality of records which are initially stacked above a turntable and are dropped one-by-one on to the latter for playing, the dropping of the records, and the movement of the pick-up arm to the appropriate position for commencing the playing of each record, being controlled by a control unit set in motion by starting of the machine or by the pick-up arm when it reaches the inner part of the groove of a record and arranged, when set in motion, to complete a cycle of movement.

In order that such a machine may be able to play records of different sizes and that the pick-up may move automatically to the correct position for starting to play a record of any size, it has been proposed to provide a sizing mechanism including feeler means co-operating with each record before it is played, and means associated with the feeler means which are set thereby to determine the radial distance from the record axis of the position to which the pick-up moves before the stylus of the latter is brought into engagement with the record.

The object of the invention is to provide an improved sizing mechanism which is reliable in operation.

According to the present invention, in a sound reproducing machine of the kind referred to mechanism for positioning the pick-up arm at the correct radial distance from a record centre preparatory to playing the record comprises a feeler carrier having two spaced feeler members, means for moving the feeler carrier to cause the feeler members, moving together as one, to traverse the surface of a record towards the outer edge of the latter, said feeler members being movable one relative to the other in a direction transverse to said record surface and being so relatively positioned on the feeler carrier that one feeler member reaches the edge of the record before the other, and means responsive to relative movement of the feeler members, when one of them passes over the edge of the record, to set a stop limiting inward movement of the pick-up from a position outside the circumference of the largest size of record to be accommodated.

The relative movement of the feeler members may control electrical contacts to effect electrical setting of the stop.

The feeler carrier may be pivotally mounted on an arm mounted for both pivotal movement about an axis which is itself movable in the plane of movement of the arm.

Preferably the movements of the sizing arm about the said axis, and the movements of the said axis are effected by separate linkages operated by a rotary control unit.

The arm may be guided by a projection thereon engaging the edge of an opening in a fixed plate.

The stop may be carried by a stop arm movable across the path of a stepped edge of a plate moving inwardly and outwardly with the pick-up arm, a latch associated with the stop arm being engaged by energisation of a solenoid with a latch arm operable to produce such movement of the stop arm and the said solenoid being de-energised by the opening of electrical contact means associated with the feeler carrier when the said feeler members move one relative to the other due to one of them passing over the edge of a record.

The invention is hereinafter described with reference to the accompanying drawings, which show a sound reproducing machine in which the recording on the underside of the lowermost of the stacked records can be played before that record falls on to the turntable for the playing of the recording on its top side.

Figures 1, 2:
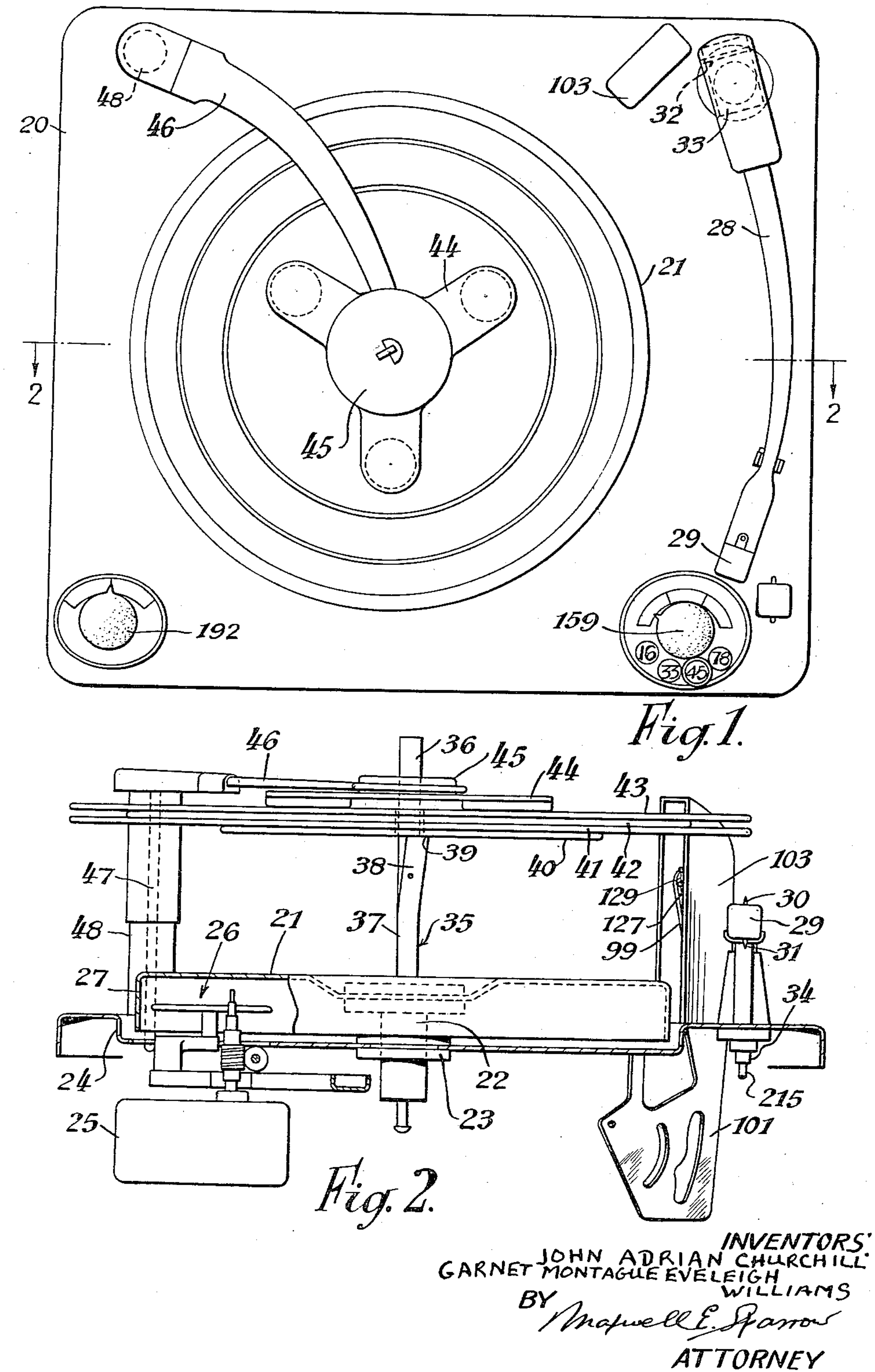
FIGURE 1 is a plan view of the sound reproducing machine.
FIGURE 2 is a sectional elevation on the line 2—2 of FIGURE 1; some of the mechanism being omitted.

Referring to FIGURES 1 and 2 of the drawings the working parts of the sound reproducing machine are mounted on a base plate 20 which may be mounted in any suitable cabinet, preferably on resilient supports (not shown).

A turntable 21 is mounted on a tubular spindle 22 supported in a bearing 23 at the centre of a depression 24 in the base-plate 20, and is driven by an electric motor 25 supported on the underside of the base-plate 20, through a transmission mechanism 26, more fully described hereinafter, providing a frictional drive to a dependent rim 27 on the turntable.

Figures 4A, 10, 10A, 11:
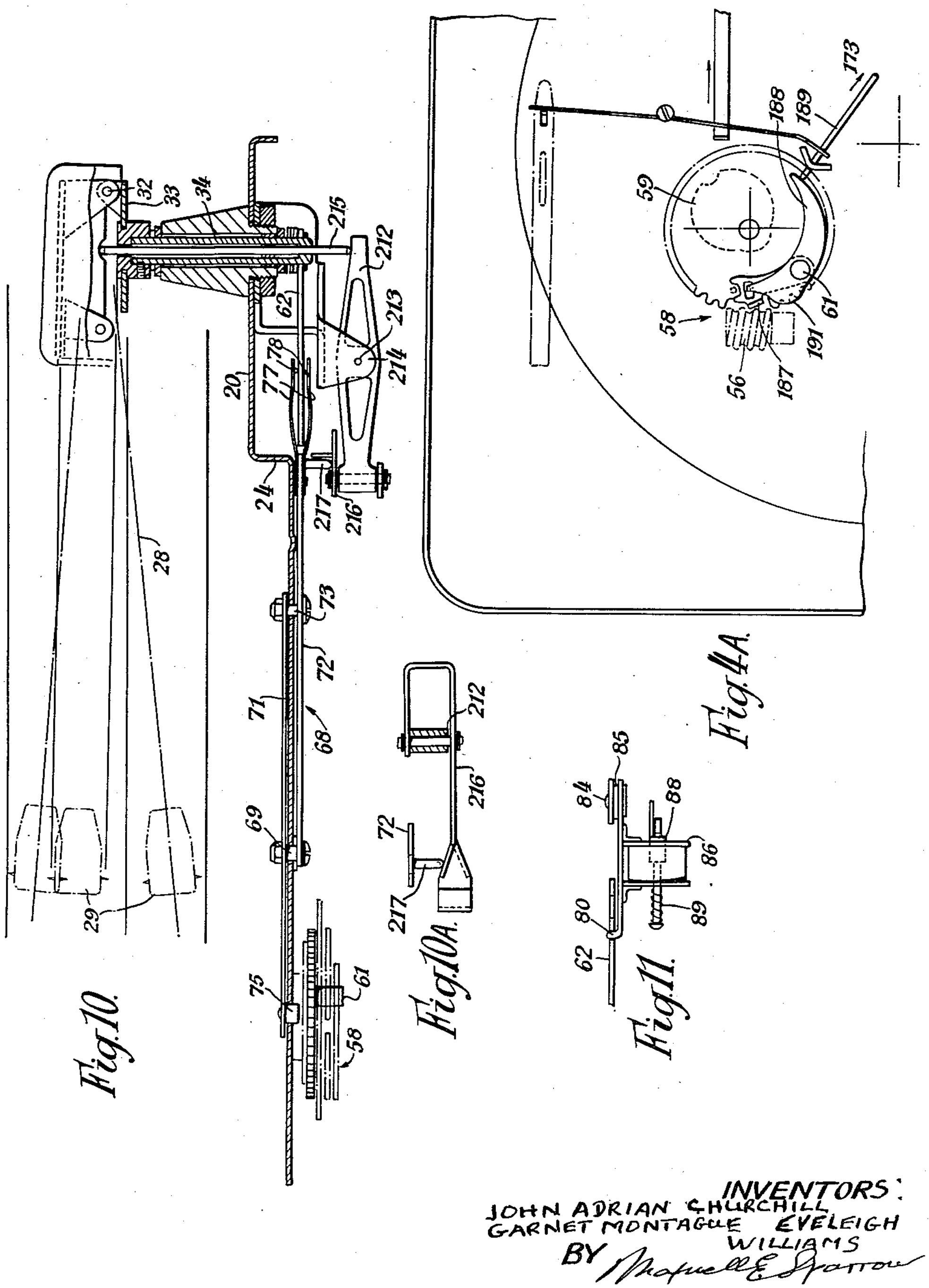
FIGURE 4A is an inverted plan view of the control unit showing the parts in position for initiating a cycle thereof.
FIGURE 10 is a sectional elevation through the pivot about which the pick-up arm swings, showing the mechanism for swinging the said arm inwardly and outwardly.
FIGURE 10A is a detail plan view of part of the mechanism shown in FIGURE 10.
FIGURE 11 is a detail elevation showing the stop arm.

A pick-up arm 28, carrying a pick-up 29 provided with two stylii 30 and 31 respectively projecting in downward and upward directions is mounted (as shown in FIGURE 10) to swing in a vertical plane about a pivot pin 32 carried by a bracket 33 fixed to a vertical tubular spindle 34 mounted in a bearing member fixed to the base-plate, the spindle 34 extending downwardly through the base-plate.

A removable spindle 35, frictionally engaged in the bore of the tubular spindle 22 so as to rotate with the turntable, extends upwardly from the said turntable, the spindle having concentric upper and lower portions 36 and 37 and an oblique intermediate portion 38 the upper end of which forms a shoulder 39 to support a stack of records above the turntable, mechanism being provided to move the records one-by-one off the shoulder and allow them to fall on to the turntable. Records on the spindle are indicated by the reference numerals 40, 41, 42 and 43, and are held in a horizontal position, and caused to rotate with the turntable 21, by an upper turntable 44 keyed to the spindle and rotatable in a bearing 45 carried by an arm 46 supported on a spindle 47 slidable in a guide pillar 48 standing up from the base-plate 20.

Figure 3:
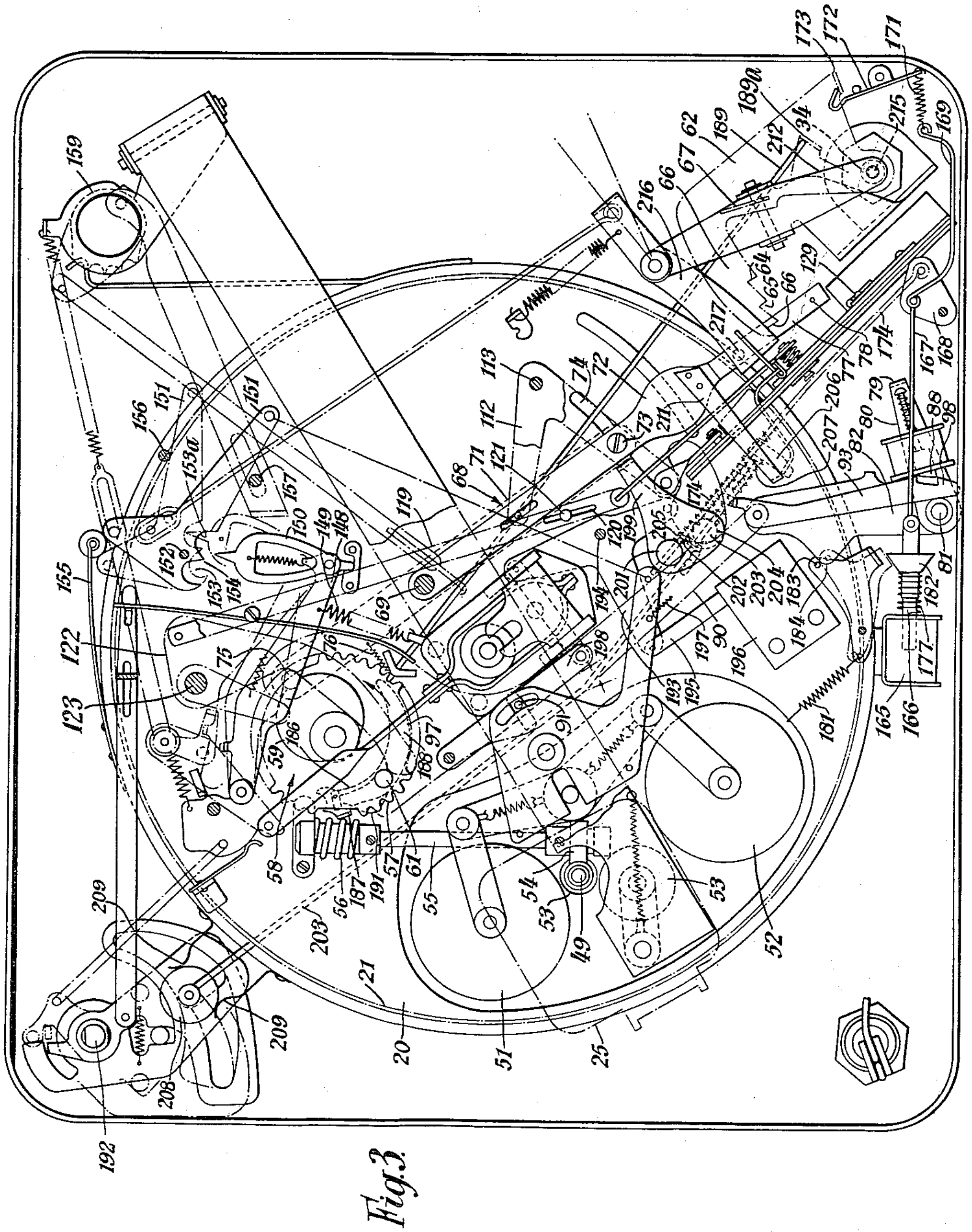
FIGURE 3 is an inverted plan view of the machine showing the parts in the positions they occupy when the machine is not working.
Figure 4:
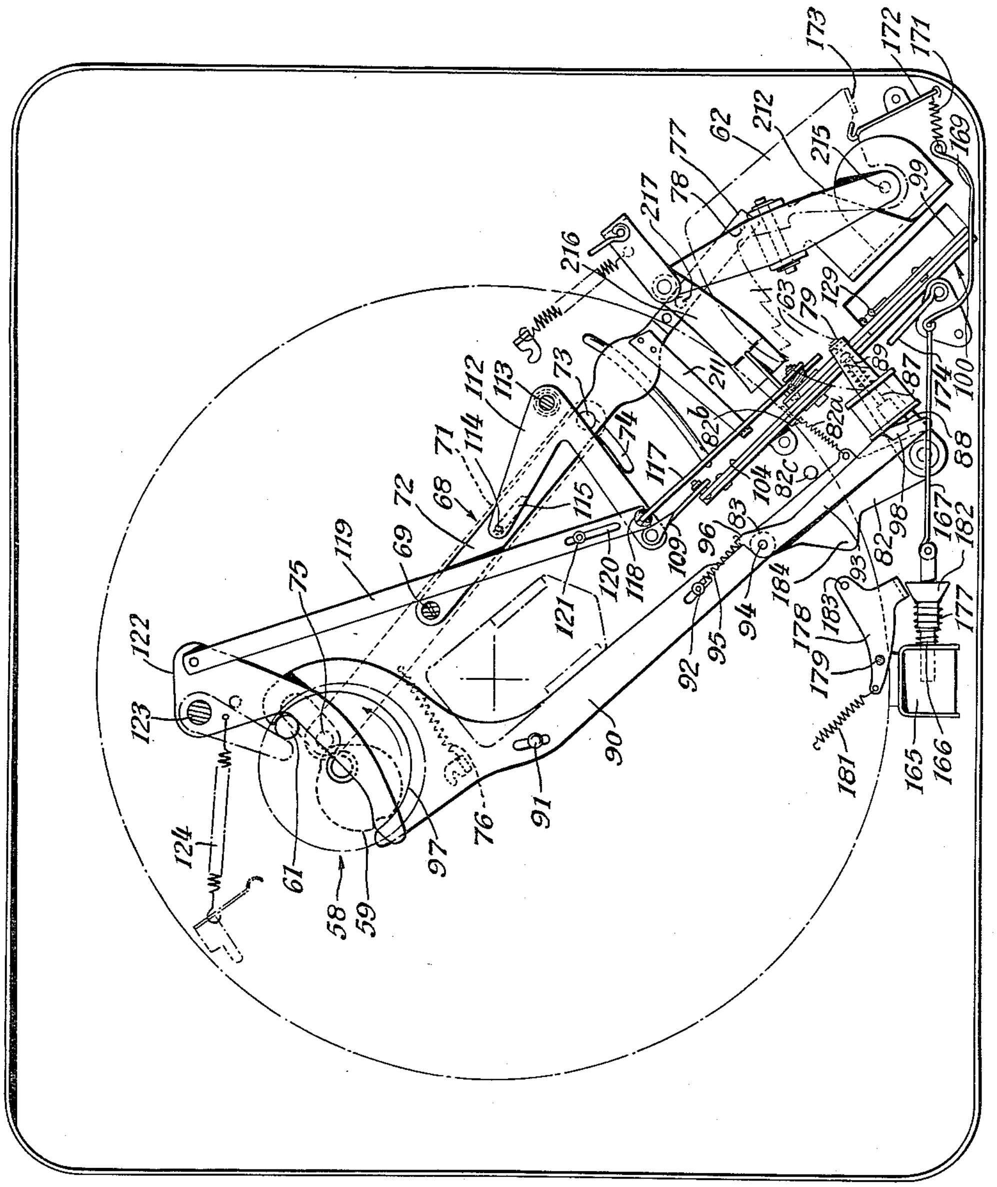
FIGURE 4 is a view similar to FIGURE 3 with some of the parts omitted, the illustrated parts being in the positions they take up at the mid point of a control cycle.

Referring now to FIGURES 3 and 4 of the drawings, the electric motor 25 has mounted on its spindle a stepped driving wheel 49 adapted to drive the turntable through one or other of two friction wheels 51 and 52, an idler wheel 53 being interposed between the driving wheel 49 and the friction wheel 52 so that the turntable is driven in opposite directions by bringing the friction wheel 51 or the friction wheel 52 into an operative position, and the speed of the turntable is determined by moving the friction wheels vertically to bring them into the plane of the appropriate portion of the driving wheel 49. This driving mechanism is fully described in our co-pending cognate applications Nos. 24019/58 and 20451/59. The spindle of the electric motor also carries a worm 53 meshing with a worm wheel 54 mounted on a shaft 55 journalled in bearings on the underside of the base-plate 20, the shaft 55 also having mounted on it a worm 56 for driving an interrupted gear 57 forming part of a rotary control unit 58 brought into operation when the machine is started, and at the termination of the playing of each recording, to reset the machine for playing the next recording, or to stop its operation when there are no more records to be played.

The rotary control unit 58 includes a cam 59 and a pin 61, eccentric to the axis of the said control unit, the pin 61 acting on various arms as hereinafter described.

The tubular spindle 34 carries, below the base-plate 20, a plate 62 including an arcuate arm 63 concentric with the spindle 34 and having one end thereof shaped to provide three steps 64, 65, 66. The plate 62 is formed on opposite sides with two grooves, one of which is shown at 67, these grooves being co-extensive and extending radially with respect to the spindle 34.

A compound arm 68, pivoted at 69 on thet base-plate and having one of its portions 71 above the base-plate and the other portion 72 below the base-plate has both of its portions attached to the pivot pin at 69, the two portions being also connected one to the other by a pin 73 passing through an arcuate slot 74 in the base-plate. The portion 71 of the arm 68 carries a roller cam follower 75 co-operating wtih the cam 59, against the profile of which it is urged by a spring 76, the portion 72 of the arm 68 carrying two spring fingers 77 formed with pips 78 adapted to engage in the grooves 67 in the plate 62. The arm 68 normally occupies the position in which it is shown in FIGURE 3, the cam follower being in engagement with the cam at the highest point of the latter, and, during a cycle of the control unit, its end on which the spring fingers 77 are mounted swings first anti-clockwise and then clockwise about the pivot 69. At some point during its anti-clockwise swing, depending on the position of the pick-up arm, the pips engage in the grooves 67, and motion is transmitted to the plate 62 to swing the pick-up arm outwardly to a maximum outward position, and then to swing the said pick-up arm inwardly to a position for commencing to play the next record, that position being determined by setting a movable stop 79 to be engaged by one or other of the steps 64, 65, 66 on the plate 62.

The stop 79 is constituted by the downturned end of an arm 80 pivotally mounted at 81 on the free end of a supporting arm 82 which is in turn pivotally mounted at 83 on the base-plate 20.

A tension spring **82*a*, anchored at 82*b* to the base-plate 20, urges the carrier lever 82 towards a stop pin 82*c***.

The pivot between the stop arm 80 and the supporting arm 82 is constituted by a rivet 84, a friction washer 85 (FIGURE 11) being interposed between the stop and the arm and acting to resist free relative movement thereof.

The stop arm 80 has fixed to it a solenoid coil 86 the armature 87 of which carries a latch bolt 88 normally retracted by a coiled spring 89 towards the stop 79 but movable, when the solenoid is enrgised, towards the pivoted end of the stop arm 80.

A member 90, guided for sliding movement by pins 91, 92 fixed to the underside of the base-plate 20 and engaging in slots in the said member 90, carries at one end a latch arm 93 pivoted to the member 90 at 94, a tension spring 95, anchored at one end to a tail-piece 96 on the latch arm 93 and at the other end to the pin 92 urging the latch arm 93 into a position in which the tail-piece 96 engages with an edge of the member 90 to locate the ltach arm in alignment therewith, and also urging the member 90 to one end of its movement.

The other end of the member 90 is formed with a concave cam edge 97 embracing the control unit 58 and co-operating with the driving pin 61 in such a way that the said member 90 and the latch arm 93 are moved to-and-fro along a path substantially perpendicular to the length of the latch arm during each cycle of the control unit, with dwell periods between their motions in opposite directions.

The solenoid coil 86 is energised, in a manner hereinafter described, during a variable part of the movement of the latch arm 93 towards the control unit 58, so as to project the latch bolt 88 into a position to engage in a notch 98 in the latch arm 93 so that, during the period for which the solenoid coil 86 is energised, the stop arm 80 moves with the latch arm, and the position to which it is moved depends on the period during which the solenoid is energised.

The period of energisation of the solenoid coil 86 is controlled by a feeler mechanism co-operating with the records stacked on the spindle 35. This mechanism comprises a main arm 99 (hereinafter called the sizing arm) movable in a plane substantially radial to the turntable 21. A plate 100, also lying in a plane substantially radial to the turntable 21, is secured to the base plate 20, the said plate 100 having a portion 101 below the base-plate 20, and a portion 102 above the base-plate 20, the upper portion of the plate 100 forming one side of an upstanding housing 103, open at its side facing the turntable, to house the sizing arm 99 when the latter is in an inoperative position.

A bell-crank lever 104 is pivoted at its elbow at 105 on the plate portion 101, one arm of the said bell-crank lever 104 being pivoted to the sizing arm 99, by a pivot pin 106 guided in an arcuate slot 107. concentric with the pin 106, in the plate portion 101. The other arm of the bell-crank lever 104 is pivoted at 108 to a twisted link 109 which is in turn pivoted at 111 to one arm of a second bell-crank lever 112 moving in a horizontal plane and pivoted at 113 on the base-plate 20, the other arm of the bell-crank lever 112 carrying a pin 114 engaging in a longitudinal slot 115 in the portion 72 of the compound arm 68. The sizing arm 99 also has pivoted to it at 116 one end of a link 117 the other end of which is coupled by a universal joint 118 to another link 119 slotted at 120 to engage a guide pin 121 depending from the base-plate 20, and pivoted at its end remote from the universal joint 118 to an arm 122. The arm 122 is pivoted at 123 on the base-plate 20 and extends into the path of the driving pin 61, against which it is urged by a spring 124, so that the arm 122 is rocked to-and-fro during each cycle of operation of the control unit. The oscillation of the compound arm 68 during a control cycle moves the bell-crank lever to cause the pivot pin 106 to move up and down the slot 107.

The sizing arm 99 also carries a pin 125 engaging in an opening 126 in the plate portion 101, the shape of the said opening determining the path followed by the sizing arm 99 during a control cycle.

A finger 127 pivotally mounted on the free end of the sizing arm 98 is biassed by a tension spring 128, connected between it and an anchor point on the said sizing arm, to a predetermined position, and on the free end of the finger 127 there is pivotally mounted a feeler carrier 129 having a tail 131 movable between stops 132, 133 on the finger 127. The feeler carrier 129 is frictionally loaded at its pivot so that it is not freely movable and it carries two feeler members 134, 135 in the form of balls. A pad **135*a* mounted in the housing 103 acts on the feeler members 135, 135 when the sizing arm 99** is retracted into the housing, to move the tail 131 into engagement with the stop 132.

The sizing arm 99 and the finger 127 are made of electrically insulating material such as a stiff thermoplastic or thermo-setting plastic material, and are provided with electrical conductors which may be produced by the known printing method. Two such conductors 136 and 137 extend along the finger 127, the conductor 136 being permanently connected at one end by the pivot pin 138 for the finger to a conductor 139 on the sizing arm 99, and the conductor 137 being permanently connected through the spring 128 to a conductor 141 on the sizing arm 99. The feeler carrier 129 carries a contact 142 which, when the tail 131 is in engagement with the stop 133, engages only with the conductor 137, and, when the tail 131 is in engagement with the stop 132, bridges the conductors 136 and 137. A third conductor 143 on the sizing arm 99 terminates in a projecting contact 144 adjacent the pivot of the finger 127, the said contact 144 being engaged, when the finger 127 is in the position to which it is urged by the spring 128, by a conducting bracket 145 by which the spring is attached to the finger, thus connecting the conductor 137 to the conductor 143. The conductor 143 terminates at its other end at a contact 146 which, at one end of the movement of the arm 98 engages a fixed contact 147 in the plate portion 101.

The driving pin 61 of the control unit 58, during the rotation of the control unit, engages and displaces an arm 148, urged towards the said driving pin 61 by a tension spring 149, to move to-and-fro a pecker member 150 co-operating with a rocking member 151 pivoted at 152 on the baseplate 20, the rocking member 150 being formed with two notches 153 and 153*a* one on each side of a V-shaped nose 154, the centre line of which passes through the pivot axis of the said rocking member 151, the said rocking member being acted on by a spring 155 which, once the said rocking member has passed a dead-centre position, tends to urge it towards either one of two movement limiting stops 156 and 157, depending on its direction of motion. Depending on the position of the rocking member 151 when the pecker member 150 is operated, the said pecker member is guided by the nose 154 into one or other of the notches 153 and 153*a*, and moves the rocking member over its dead-centre position so that it moves to its other extreme position. Thus the rocking member 151 is moved in opposite directions by successive cycles of the control unit 58, this movement being used to determine whether the pick-up is lifted to play a record above it or lowered to play a record on the turntable, whether or not a releasing mechanism is operated to cause a record to drop on to the turntable, and in which direction the turntable is rotated for the next playing operation. The mechanism by which these selections are determined forms no part of the present invention, and will not be described herein.

Associated with the pecker member 150 is a bar 158 movable by means of a control knob 159 on the upper side of the turntable from the position shown in FIGURE 3, in which it is clear of the pecker member, to a position in which it deflects the said pecker member towards the left, thus causing it, on each cycle of the control unit 58, to move into the notch 153 on the rocking member, so that the position of the rocking member is not changed, and the machine remains set for playing the upper sides of records on the turntable.

The rocking member 151 carries an electrical contact 160, and the bar 158 carries a co-operating contact 161 which, when, in either position of the bar 158 is engaged by the contact 160 when the rocking member 151 is in the position for playing the upper side of a record.

Figures 5, 12:
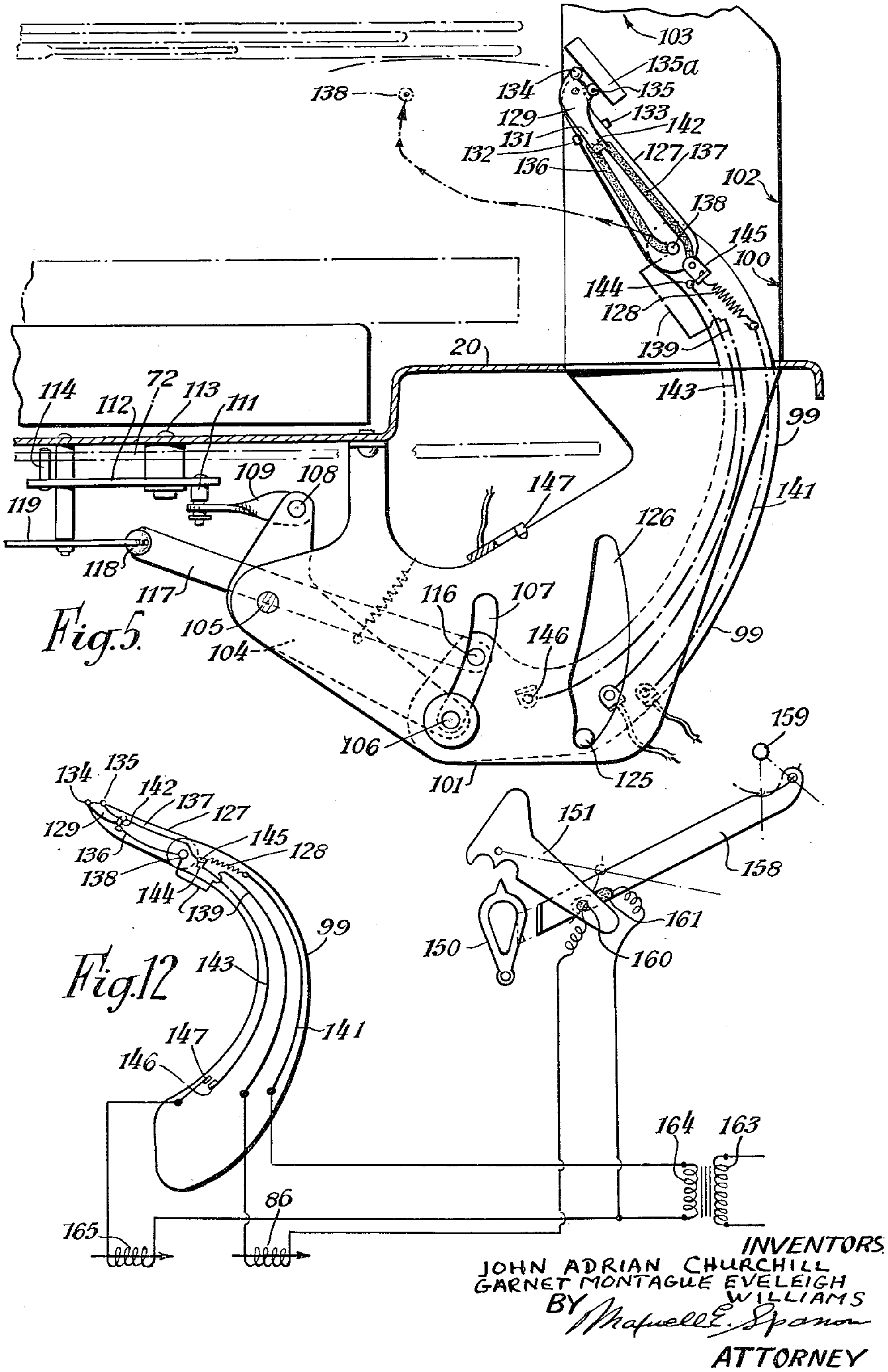
FIGURE 5 is a sectional elevation taken in the plane of the sizing arm showing the said arm in its retracted position.
FIGURE 12 is an electrical diagram.

As shown in FIGURE 12, a transformer 162, which may be incorporated in the electric motor 25, its primary winding 163 being the main field winding of the motor, has a low voltage secondary winding 164 to supply current to the electrical circuit associated with the sizing arm 99.

One end of the secondary winding 164 of the transformer is connected to the conductor 141, and the other end of the said winding is connected to the contact 161, and to one end of a solenoid coil 165, the purpose of which will be described later in this specification. The contact 160 is connected to one end of the solenoid coil 86, the other end of which is connected to the conductor 139. The other end of the solenoid coil 165 is connected to the contact 147.

The solenoid coil 165 co-operates with an armature 166 (FIGURE 3) coupled by a link 167 to one corner of a triangular plate 168 pivoted at another corner thereof to the base-plate 20, another link 169, pivoted to the triangular plate 168 co-axially with the link 167, acting through a tension spring 171 on a pivoted latch 172 adapted to engage with a turned-up ear 173 on the plate 62 to hold the pick-up arm in a position clear of the records. To the third corner of the triangular plate 168 is connected one end of a further rod 174.

A spring 177 acting on the armature 166 urges it in a direction to release the latch 172, and the solenoid coil 165, when energised, urges it in the opposite direction. A latch 178, pivoted at 179 on the base-plate 20, is urged by a tension spring 181 about its pivot to engage a collar 182 on the armature 166 and retain the latter in the position to which it is moved when the solenoid coil 165 is energised, the collar 182 having a frusto-conical face co-operating with the latch 178 to move it out of the way as the armature moves under the influence of the solenoid coil. The latch 178 also carries a pin 183 adapted to be engaged by a nose 184 on the supporting arm 82 for the stop arm 79 to release the said latch 178.

The rotary control unit 58, as shown in FIGURE 3 and FIGURE 4A, normally occupies a position such that the gap in the teeth of the interrupted gear 57 is opposite the worm 56, so that the latter is free to rotate without driving the interrupted gear. An arm 186, pivoted on the driving pin 61, is formed with a projection 187 adapted to engage with the thread of the worm 56 so as to cause the latter to be moved far enough to engage its teeth with the said thread, the arm 186 being pivoted co-axially with another arm 188, with which it has a lost-motion connection. The arm 188 is operated by a push rod 189 when the pick-up reaches the inner end of the sound track on a record, the push rod 189 being moved by the ear 189*a* on the plate 62 already mentioned, to engage the projection 187 with the worm, and is moved to its inoperative position as the control unit approaches the end of a revolution by a shoulder 191 on the arm 188 engaging the worm. The arm 188 is similarly operable to start a control cycle by the actuation of a "start" control 192.

A three-armed lever 193 pivoted at 194 on the base-plate 20 has one arm thereof connected by a link 195 to an on-off switch 196 in the circuit of the electric motor 25, and is urged by a tension spring 197 extending between that arm and an anchorage point on the base-plate 20 in a direction to close the switch. Another arm of the lever 193 is linked to a lever 198 arranged to move the friction wheels 51, 52 towards and away from the turntable rim, and the third arm carries a trigger member 199, pivoted to the said arm. The rod 174 passes through a boss 201 on the trigger member 199, and a coiled compression spring 202, fixed at one end to the rod 174, acts on the said boss, applying, when the plate 168 is rotated by the solenoid 165, a thrust tending to rotate the trigger member 199, clockwise as shown in FIGURE 3, about its pivot. Another rod 203, passing through another boss 204 on the trigger member 199, carries a pair of spaced collars 205 and 206 one on each side of the boss 204, a coiled compression spring 207 between the boss 204 and the collar 206 tending to urge the collar 205 against the boss 204. The other end of the rod 203 carries a spool

208 movable to-and-fro between two spring fingers 209, 209 fixed to the base-plate 20, so as to maintain the said spool in either one of two positions.

The trigger member 199 co-operates with the portion 72 of the arm 68, a down-turned end thereof being urged against the side of the said arm portion 72 when the solenoid coil 165 is energised and moving, during the initial part of the succeeding oscillation of the arm 68, into a position substantially perpendicular thereto, so that on the return movement of the said arm 68 the three-armed lever is rocked to open the switch 196, this movement of the trigger member 199 also moving the spool 208 through the spring fingers 209, 209.

A striker 211 on the portion 72 of the arm 68 co-operates with the supporting arm 82 to hold it normally in a position such that the stop arm 79 is out of the path of the plate 62, allowing the said stop arm to move into the path of the said plate only during a control cycle.

The upward and downward movement of the pick-up arm 25 to bring the pick-up into position for playing records above or on the turntable respectively is effected by a lever 212, pivoted at 213 on a bracket 214 fixed to the base-plate 20, the lever 212 acting on the pick-up arm 28 through a rod 215 extending through the tubular spindle 34, and being moved up or down by a double ramp member 216 pivoted to it and moved to bring an upward ramp or a downward ramp thereon into alignment with a pin 217 carried by the portion 72 of the arm 68.

When the machine is not operating, and also when a record is being played, the control unit 58 is stationary, the worm 56 being opposite to the gap in the teeth of the gear wheel 57. The driving pin 61 of the control unit engages the concave cam edge 97 on the arm 90 adjacent one end of the latter, as shown in FIGURE 3, and holds the said arm 90 at one limit of its movement. The arm 68, by reason of the fact that its cam follower 75 is in engagement with the highest point of the cam 59, is swung to the lefthand extreme of its arc of movement, and the striker 211 is therefore in engagement with the carrier lever 82, holding the latter in the position shown, where the stop arm 80 is clear of the path of the plate 62. The latch arm 93 is held by the spring 95 against the end of the solenoid coil 86.

The bell-crank lever 112, being linked to the arm portion 72, holds the pivot 106 at the lower end of the slot 107, and the arm 122, being held against the driving pin 61 by the spring 124 holds the link 117 in its outermost position.

It will be assumed that the machine is in the position for playing, or is playing, the top side of a record on the turntable, so that the rocking member 151 is turned clockwise in FIGURE 3 to the extremity of its movement as shown in that figure.

The contacts 160, 161 are therefore closed. The contacts 144, 145 are also closed by the spring 128, and the contact 142 is in engagement with both conductor 136 and 137, the tail 131 being against the stop 132. The circuit of the solenoid coil 86 is therefore closed. The contacts 146, 147 are open.

The position of the sizing arm 99 and its associated parts is as shown in FIGURE 5.

When the arm 186 is moved to bring the projection 187 into engagement with the thread of the worm 56 (the motor 25 being simultaneously started by closing the switch 196 if the machine has not been running) the control unit starts to rotate, the driving pin 61 moving the arm 122 and the cam 59 moving the arm 68 and the bell-crank lever 104.

Figures 6, 7:
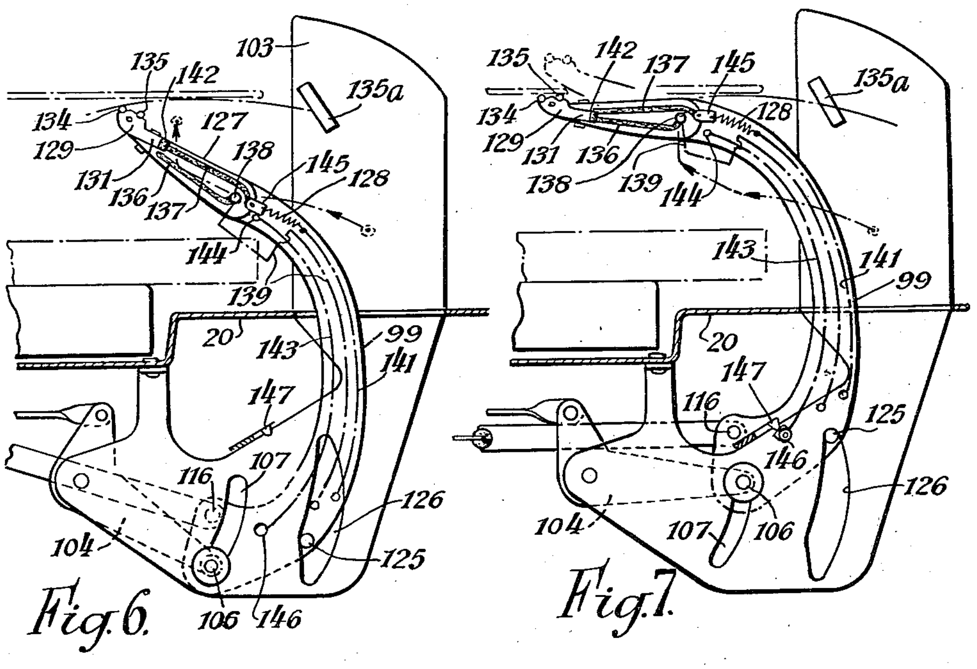
FIGURES 6, 7, 8 and 9 are views similar to part of FIGURE 5 showing the sizing arm in different positions.

Due to the shape of the cam 59, very little movement is imparted to the bell-crank lever 104 during the first 75° of rotation of the control unit 58, but the arm 117 is pulled inwardly, causing the sizing arm 99 to swing inwardly about the pivot 106 to the position shown in FIGURE 6. During the next 45° of rotation of the control unit, the driving pin 61 passes over an arcuate portion of the arm 122 and transmits no substantial motion of the sizing arm 99, but the arm 68 is moving anti-clockwise and, through the bell-crank levers 112 and 104 swings the pivot 106 upwardly along the slot 107, with some inward motion of the arm, to bring the feelers 134, 135, into engagement with the under-surface of the lowermost record 40 in the stack on the spindle. This position is shown in FIGURE 7.

The clockwise movement of the arm 68 also withdraws the striker 211, allowing the carrier lever 82, the stop arm 80 and the latch arm 93 to move under the influence of the spring 82*a* until the said carrier lever engages the stop 82*c*. At some time during this segment of the movement of the arm 68, the pips 78 engage in the grooves 67 and swing the pick-up arm 28 outwardly.

Figures 8, 9:
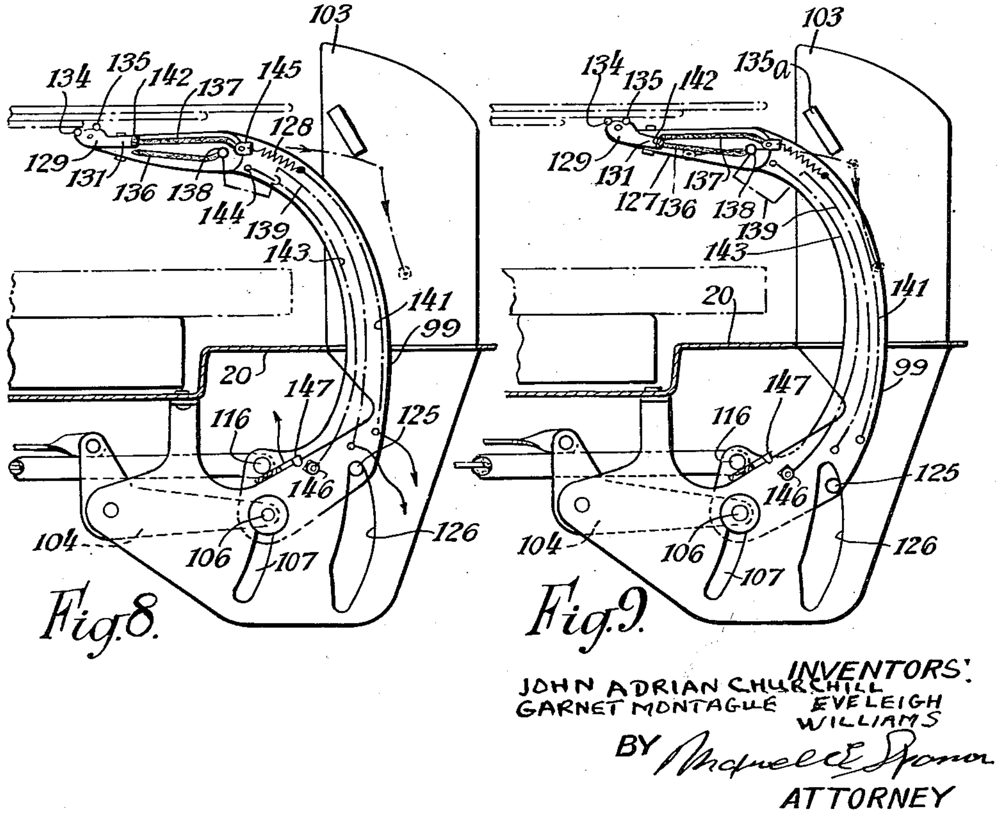

During the next 60° of rotation of the control unit 58, the sizing arm 99 is swung outwardly, causing the feelers 134 and 135, one following the other, to move outwardly across the record 40 towards its edge and, since the solenoid coil 85 is energised, the latch bolt 88 is projected into the notch 98 in the latch arm 93, the stop arm 80, as will presently be described, having previously been moved clockwise about its pivot on the carrier arm 82, to a position beyond the step 64 on the arm 63. So long as the feelers 134 and 135 are both in contact with the record surface, the contact 142 remains in its position bridging the conductors 136, 137, and the latch bolt 88 remains in the projected position, but as soon as the leading feeler 135 reaches the edge of the record the feeler carrier 129 is tilted, as shown in FIGURE 8, moving the tail 131 against the stop 133 and opening the circuit of the solenoid coil 86. During this segment of rotation of the control unit 58, the drive pin 61 is moving along the second half of the length of the cam edge 97, and is allowing the bar 90 to move, under the influence of the spring 95, generally towards the axis of said control unit. The latch arm 93 is thus caused to move across the end of the solenoid coil 86 and, so long as the said coil remains energised so that the latch bolt 88 extends into the notch 98, moves the stop arm 80 about its pivot on the supporting arm 82, across the path of movement of the arm 63 on the plate 62. Thus the position to which the stop arm 80 is moved depends on the point at which the feeler carrier 129 passes over the edge of a record. The various parts of the mechanism are now in the positions shown in FIGURE 4.

At the end of this segment of movement of the control unit, the sizing arm 99 has moved to a position in which the feelers are clear of the largest size of record to be used on the machine, and the feeler carrier has its tail 131 against the stop 133, so that the circuit of the solenoid coil 86 is open.

After the feelers have passed over the edge of the record 40, the feeler carrier, if the next record 41 is larger than the record 40, as shown in the drawings, will re-close the circuit of the solenoid coil 86, as shown in FIGURE 9, but, as the notch 98 has now moved away from the latch bolt 88, no further movement of the stop arm 80 is caused.

If the machine is set for playing both sides of the records, the rocking member 151 is operated substantially at the end of the last-mentioned segment of movement of the control unit 58, so that the contacts 160, 161 are opened, and the circuit of the solenoid coil 86 is prevented from closing by any movement of the feeler carrier 129.

If, on the other hand, the machine is set for playing only the top sides of records on the turntable, the arm 158 being set to hold the pecker member 150 in a leftwardly inclined position, the contacts 160, 161 are not opened at all during the control cycle.

In either case, during the next 145° of the rotation of the control unit 58, the sizing arm 99 remains substantially stationary, a record is dropped on to the turntable, and the pick-up arm is caused to swing inwardly by the return motion of the arm 68, the pick-up being lowered on to the surface of the record by the ramp unit 216 and its associated parts. The striker 211 does not engage the carrier arm 82 until the pick-up has had time to move inwardly beyond the edge of the smallest size of record to be used. Consequently one or other of the steps 64, 65, 66 on the arm 63 of the plate 62 comes into engagement with the stop 79 on the stop arm 80 and stops further movement of the plate 62, the pips 78 then riding out of the grooves 67, so that the arm 68 completes its movement leaving the plate 62 and pick-up arm behind and the ramp member 216 lowers the pick-up on to the record.

During the last 35° of rotation of the control unit 58 the driving pin 61 again comes into engagement with the cam edge 97, and displaces the bar 90 away from the axis of the control unit. If the machine is set for playing both sides of the records the solenoid coil 86 is at this time de-energised, so that the latch arm 93 moves idly across the end of the solenoid, leaving it unmoved, and the stop 79 remains in the same position during the first half of the next cycle of the control unit, since the contacts 160, 161 are open.

If, on the other hand, the machine is set to play only the top sides of the records, the contacts 160 and 161 remain closed. During this last segment of movement of the control unit both the bell-crank lever 104 and the link 117 are moved to bring the sizing arm downwardly to the position shown in FIGURE 5, and, during such movement the feelers 134, 135 engage the pad 135*a* causing the feeler carrier to rock to the position in which the conductors 136 and 137 are interconnected. The movement of the bar 90 by the driving pin 61 does not commence until after the feeler carrier has been so moved, so that the latch bolt 88, is projected during such movement of the bar 90, and the stop arm 80 is moved clockwise about its pivot back to its initial position. If the machine is set for playing both sides of the records, this re-setting action takes place during the last portion of the control cycle following the playing of the top side of a record, after the rocking member, i.e. the next cycle after the one when the stop arm was set to an operative position.

At all times except when the fellers 134, 135 are in engagement with a record surface, the contacts 144, 145 are held closed by the spring 128, the engagement of the feelers with a record surface rocking the finger 127 about its pivot to open these contacts. Consequently, if the feelers 134, 135 engage a record during the upward and inward movement of the sizing arm these contacts are opened, and when, at the end of said upward and inward movement, the contacts 146, 147 close, the solenoid coil 165 is not energized. If, however, there is no record present, the finger 127 is not deflected, and the circuit of the solenoid coil 165 is closed when the contacts 146, 147 close. The armature 166 is thus moved to the left in FIGURE 3, setting the latch 172 and moving the rod 174 to urge the trigger member 205 to its operative position. This happens when the arm 68 is at the end of its anti-clockwise movement, and the pick-up arm is therefore swung fully out. As the arm 68 returns, the latch 172 engages the ear 173 to stop inward movement of the pick-up arm at a position over a rest (not shown), and the said arm 68 then engages the trigger member 205 and, at the completion of its stroke, moves the three-armed lever 193 to open the switch 196 and move the spool 208 through the fingers 209 to its "off" position.

The armature 166 is held in the position to which it is moved by the energisation of the coil 165 by the latch 178, which is released by the nose 184 on the carrier lever 81 during the first cycle of the control member 58 when the machine is re-started.

It will be understood that, although the invention has been described with reference to a sound reproducing machine which plays the undersides of records before they are dropped on to the turntable, and plays the upper sides whilst they are resting on the turntable, it may also be used in a sound reproducing machine in which only the upper sides are played whilst the records rest on the turntable. In such a machine, a sizing operation would have to be effected, and the sizing stop returned to an inoperative position, during each cycle of the control member, so that the contacts 160, 161 would be omitted and one end of the solenoid coil 85 would be connected directly to the transformer secondary winding 164.

We claim:

1. A sound reproducing machine having a base plate, an upper and a lower turntable, a vertical spindle extending upwardly from said lower turntable through the center of said upper turntable, said spindle being adapted to receive records having various diameters, means permitting said records to drop one by one onto said lower turntable, a pick-up arm carrying a pick-up head for playing both sides of each one of said records, said pick-up arm swingingly arranged in a horizontal plane across said records, a mechanism positioning said pick-up arm at the correct radial distance from the center of one of said records preparatory to playing said record, said mechanism comprising a sizing arm pivotally located on said base plate, said sizing arm movable in a plane substantially radial to said upper and said lower turntable, a feeler carrier mounted on said sizing arm, spaced feeler members mounted in fixed relationship to one another on said feeler carrier, means moving said feeler carrier and said feeler members thereon together transversely over the surface of one of said records from the inner diameter of said record toward the outer diameter thereof, said feeler members movable, one relative to the other, in a direction transverse to said surface of said record, said feeler members positioned relatively to said feeler carrier in such manner that one feeler reaches said outer diameter of said record prior to the other feeler, means responsive to said relative movement of said feeler members when one of them passes over the outer diameter of one of said records, and a stop on said base plate, said stop limiting the inwardly swinging movement of said pick-up arm from a position outside said outer diameter of the largest size of said records, and said means responsive to said relative movement of said feeler members setting said stop according to the actual size of the one of said records to be played.

2. A sound reproducing machine according to claim 1, and having electrical contact means on said feeler carrier and on said feeler member, said contacts being operable by movement of said feeler member relative to said feeler carrier, and electrical means setting said stop, said electrical means being controlled by said contacts.

3. A sound reproducing machine according to claim 1, and said sizing arm being pivoted on a shaft, means for moving said shaft, said feeler carrier being pivotally mounted on said sizing arm in such manner permitting swinging said feeler member and said sizing arm in the same plane of movement.

4. A sound reproducing machine according to claim 3, and having a central control unit on said base plate, and linkages operated by said central control unit, said linkages controlling said movements of said shaft.

5. A sound reproducing machine according to claim 4, and having a fixed plate, said plate having an opening, and said sizing arm having a projection thereon, said projection engaging said opening of said plate.

6. A sound reproducing machine according to claim 2, and having a stop arm, said stop arm carrying said stop, a plate having a stepped edge, said plate moving inwardly and outwardly together with said pick-up arm, said stop arm movable across the path of said stepped edge of said plate, a latch member cooperatively arranged with said stop arm, a solenoid having a latch arm thereon operable for producing said movement of said stop arm upon energization of said solenoid, and said solenoid being deenergized by the opening of said electrical contact means on said feeler carrier upon movement of said feeler members relative to one another due to one thereof passing over the outer diameter of one of said records.

7. A sound reproducing machine according to claim 6, and comprising a tail on said feeler carrier, a pair of limiting stops, said tail being movable between said limiting stops, a first electric contact, a pair of electrical conductors, a first electrical circuit comprising a source of electric current and embracing said solenoid, said electric contact bridging said pair of electrical conductors upon said tail being held against one of said limiting stops by engagement of said feeler members with one of said records.

8. A sound reproducing machine according to claim 7, and comprising a finger pivoted on said sizing arm, said feeler carrier mounted on said finger, a second solenoid having a second circuit, second contacts in said second circuit of said second solenoid, a spring on said finger, said spring urging said finger into a closing position of said second contacts, said finger being displaceable by engagement of said feeler with one of said records, opening said second contacts, said second circuit having third contacts closed only when said feeler members are in position engaging one of said records, and comprising stopping means for said sound reproducing machine, said stopping means set by second solenoid operated only when no records are present on said machine.

References Cited in the file of this patent

UNITED STATES PATENTS

| | | |
|---|---|---|
| 2,841,400 | Mueller | July 1, 1958 |

FOREIGN PATENTS

| | | |
|---|---|---|
| 812,441 | Great Britain | Apr. 22, 1959 |